US 8,558,516 B2

(12) United States Patent
Takahashi et al.

(10) Patent No.: US 8,558,516 B2
(45) Date of Patent: Oct. 15, 2013

(54) CHARGE-CONTROLLING SEMICONDUCTOR INTEGRATED CIRCUIT AND CHARGING APPARATUS

(75) Inventors: Yoshihiro Takahashi, Atsugi (JP); Daisuke Suzuki, Atsugi (JP); Yoshihiro Motoichi, Atsugi (JP); Gentaro Kurokawa, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 660 days.

(21) Appl. No.: 12/467,466

(22) Filed: May 18, 2009

(65) Prior Publication Data

US 2009/0289605 A1 Nov. 26, 2009

(30) Foreign Application Priority Data

May 20, 2008 (JP) ................. 2008-131754

(51) Int. Cl.
*H02J 7/06* (2006.01)
(52) U.S. Cl.
USPC .......................................... 320/163; 320/158
(58) Field of Classification Search
USPC ........................................ 320/163, 158–159
See application file for complete search history.

(56) References Cited

U.S. PATENT DOCUMENTS

| | | | |
|---|---|---|---|
| 5,892,381 A | 4/1999 | Koifman et al. | |
| 7,253,589 B1 * | 8/2007 | Potanin et al. | 320/138 |
| 7,479,765 B2 | 1/2009 | Kamatani | |
| 7,541,862 B2 | 6/2009 | Fujisawa et al. | |
| 7,671,564 B2 | 3/2010 | Kamatani | |
| 7,750,726 B2 | 7/2010 | Fujisawa et al. | |
| 2008/0084243 A1 * | 4/2008 | Kanamori et al. | 327/589 |

FOREIGN PATENT DOCUMENTS

| | | |
|---|---|---|
| CN | 101136589 A | 3/2008 |
| JP | 11-017457 A | 1/1999 |
| JP | 2001-051735 A | 2/2001 |
| JP | 2004-213697 A | 7/2004 |
| JP | 2004-280704 A | 10/2004 |
| JP | 2004-320865 A | 11/2004 |
| JP | 2006-228027 A | 8/2006 |
| JP | 2006-296081 A | 10/2006 |
| JP | 2007-157055 A | 6/2007 |
| JP | 2007-236065 A | 9/2007 |

OTHER PUBLICATIONS

Japanese Office Action dated Dec. 11, 2012 (and English translation thereof) in counterpart Japanese Application No. 2008-131754.

(Continued)

*Primary Examiner* — Drew A Dunn
*Assistant Examiner* — Robert Grant
(74) *Attorney, Agent, or Firm* — Holtz, Holtz, Goodman & Chick, PC (57) ABSTRACT

A charge-controlling semiconductor integrated circuit includes a current- controlling MOS transistor which is connected between a voltage input terminal and an output terminal and controls flowing current, a substratum voltage switching circuit connected between the voltage input/output terminal and a substratum to which an input/output voltage is applied, and a voltage comparison circuit to compare the input/output voltage. The charge-controlling semiconductor integrated circuit controls the substratum voltage switching circuit based on an output of the voltage comparison circuit, and the voltage comparison circuit includes an intentional offset in a first potential direction. A level shift circuit to shift the output voltage to a potential direction opposite to the first potential direction is provided in a preceding stage of a first input terminal of the voltage comparison circuit, and the input voltage is input to a second input terminal of the voltage comparison circuit.

9 Claims, 7 Drawing Sheets

(56) References Cited

OTHER PUBLICATIONS

Chinese Office Action dated Oct. 19, 2012 (and English translation thereof) in counterpart Chinese Application No. 200910203501.9.

Chinese Office Action dated Jun. 24, 2013 (and English translation thereof) issued in counterpart Chinese Application No. 200910203501.9.

* cited by examiner

| MODE | RELATION BETWEEN VDD AND VBAT | BACKGATE VOLTAGE | Q1 STATE | LEVEL SHIFT | CMP THRESHOLD VALUE |
|---|---|---|---|---|---|
| #2 OR #3 | VDD > VBAT − ΔV1, VBAT < VDD + ΔV1 | VDD | ON | ON | VBAT − ΔV1 |
| | VDD < VBAT − ΔV1, VBAT > VDD + ΔV1 | VBAT | OFF OR ON | | |
| #1 OR #4 | VDD > VBAT + ΔV2, VBAT < VDD − ΔV2 | VDD | ON OR OFF | OFF | VBAT + ΔV2 |
| | VDD < VBAT + ΔV2, VBAT > VDD − ΔV2 | VBAT | OFF | | |

CHARGE-CONTROLLING SEMICONDUCTOR INTEGRATED CIRCUIT AND CHARGING APPARATUS

BACKGROUND OF THE INVENTION

1. Field of the Invention

The present invention relates to a charge-controlling semiconductor integrated circuit and a charging apparatus for a secondary battery, and especially relates to a charge-controlling IC (semiconductor integrated circuit) equipped with a back-flow preventing function and a charging apparatus equipped with an AC-DC converter to generate an input voltage for the charge-controlling IC.

2. Description of Related Art

A charging apparatus for a secondary battery uses an IC having a charge-controlling circuit to control a charging current with a charge-controlling transistor composed of a MOSFET (insulated gate field effect transistor; hereinafter referred to as MOS transistor) provided between an input terminal to which a direct voltage from an AD adapter is input and an output terminal to which the secondary battery is connected.

In such charge-controlling IC, an input voltage, which is used as a source voltage for an inner circuit of the IC, sometimes decreases during battery charge. When the input voltage becomes below a charging voltage, even if the charge-controlling MOS transistor is turned off, there is a possibility that a reverse current (back-flow) flows to the input terminal side through a parasitic diode existing between a drain and backgate (substratum or well region).

Conventionally, there has been known as techniques for preventing a back flow a technique to provide a back-flow preventing diode between an input terminal and output terminal in series with a current-controlling MOS transistor, and a technique to provide a back-flow preventing transistor and back-flow detecting circuit to prevent a back flow. However, since a back-flow preventing element is provided in series with the current-controlling MOS transistor according, there is a defect in the above techniques that losses in these elements are large.

Figure 6:
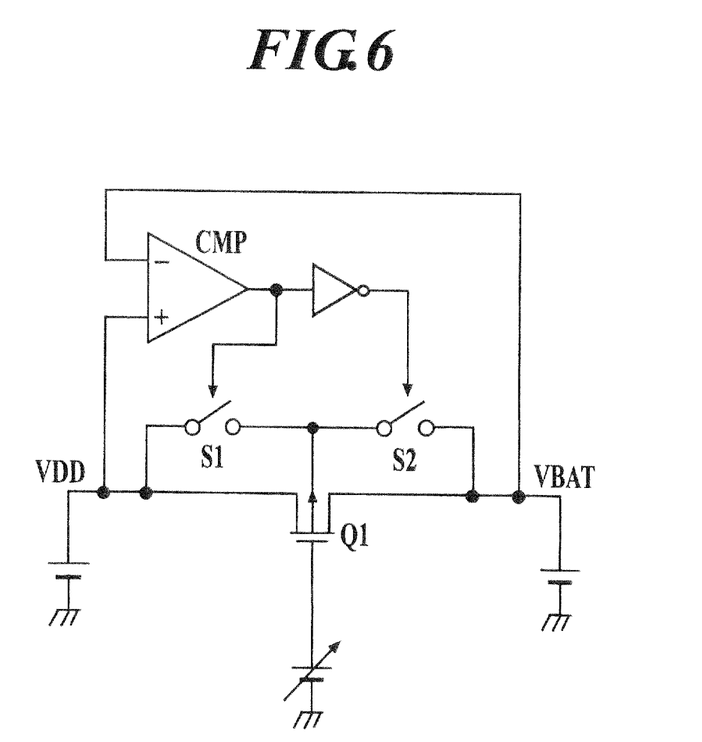
FIG. 6 is a circuit configuration diagram showing an example of a back-flow preventing circuit in a conventional charge-controlling IC.

Consequently, as shown in FIG. 6, there has been a back-flow preventing technique to prevent reverse current from flowing to an input terminal side through a parasitic diode of the Q1 by providing switches SW1, SW2 between a source/drain of the current-controlling MOS transistor Q1 and a substratum (backgate), by providing a comparator CMP to compare an input voltage and an output voltage, by turning off the current-controlling MOS transistor Q1 when the output voltage becomes higher than the input voltage, and by switching/controlling the SW1, SW2 to apply the higher voltage to the backgate of the Q1.

In addition, as an invention to prevent a back flow by switching the voltage to be applied to the backgate of the current-controlling MOS transistor, there is known techniques disclosed in Japanese Patent Application Publication Lain-Open No. 2004-213697 and Japanese Patent Application Publication Lain-Open No. 2004-280704.

Figure 7A:
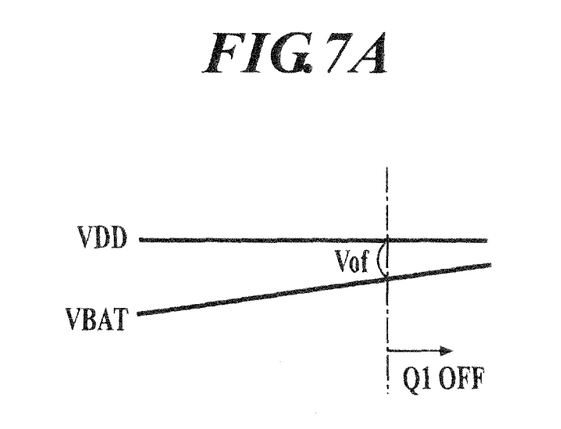
FIG. 7A is a time chart showing an operation when an offset in a minus direction occurs in the comparator in the conventional back-flow preventing circuit.

By the back-flow preventing technique to switch the backgate voltage as shown in FIG. 6, the following problem may occur by an input offset which spontaneously occurs in the comparator CMP in manufacturing process. When the input offset Vof occurs on a minus side, since the current-controlling MOS transistor Q1 is turned off at the time when an output voltage VBAT becomes higher than a voltage (VDD-Vof) which is lower than an input voltage VDD by the input offset Vof as shown in FIG. 7A, there is a possibility that a battery charge is stopped before the secondary battery is full-charged.

Figure 7B:
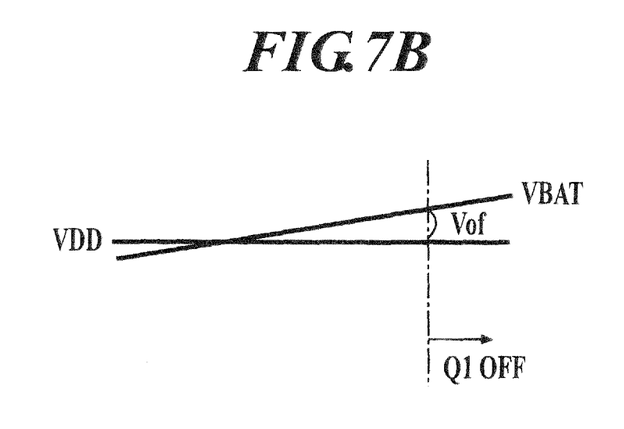
FIG. 7B is a time chart showing an operation when an offset in a plus direction occurs in the comparator.

On the other hand, when the input offset Vof occurs on a plus side, the current-controlling MOS transistor Q1 is not turned off until the input voltage VDD becomes lower than a voltage (VBAT-Vof) which is lower than the output voltage VBAT by the input offset Vof as shown in FIG. 7B. For this reason, when an AC adaptor comes off during a battery charge for example, the output side voltage transmits though the Q1 of an on-state so that the input side voltage does not become lower than the output side voltage. As a result, an output of the comparator does not invert, namely the Q1 is not turned off.

When circuits in the charge-controlling IC are configured to operate according to the input voltage VDD, there is a possibility that the VDD lowers along with the VBAT, and current is continuously supplied from the secondary battery side to an inner circuit in the IC through the Q1 of the on-state so that the battery discharges electricity.

SUMMARY OF THE INVENTION

The present invention is achieved in view of the above problems, and an object of the present invention is, in the charge-controlling IC configured to prevent a back flow by switching the backgate voltage of the current-controlling MOS transistor, even when the input offset occurs in the comparator during manufacturing process, to prevent a battery charge from being stopped before becoming a full-charged state, and to prevent the current from continuously being supplied from the secondary battery side to the inner circuit in the IC when the input voltage lowers in order to prevent the battery from discharging electricity.

The other object of the present invention is, in a charge-controlling IC provided with a plurality of control modes, to enable the backgate of the current-controlling MOS transistor to be set to a preferable voltage even in any of the modes so as to prevent a back-low.

In order to achieve the above object, according to a first aspect of the present invention, a charge-controlling semiconductor integrated circuit includes: a current-controlling MOS transistor connected between a voltage input terminal and an output terminal, which current-controlling MOS transistor controls current flowing from the voltage input terminal to the output terminal; a substratum voltage switching circuit connected between the voltage input terminal and the output terminal, and a substratum of the current-controlling MOS transistor, and to which substratum an input voltage or an output voltage is applied; and a voltage comparison circuit to compare the input voltage and the output voltage, wherein the charge-controlling semiconductor integrated circuit is configured to control the substratum voltage switching circuit based on an output of the voltage comparison circuit, the voltage comparison circuit is configured to include an intentional offset in a first potential direction, and in a preceding stage of a first input terminal of the voltage comparison circuit, a level shift circuit to shift the output voltage to a potential direction opposite to the first potential direction is provided, and to a second input terminal of the voltage comparison circuit, the input voltage is input.

Moreover, according to a second aspect of the present invention, the charging apparatus includes: the charge-controlling semiconductor integrated circuit; and the converter to convert alternating voltage to generate the input voltage, wherein the converter is configured to control the input voltage depending on the voltage output from the input voltage control circuit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE INVENTION

In the following, the preferred embodiments of the present invention will be described with reference to the drawings.

Figure 1:
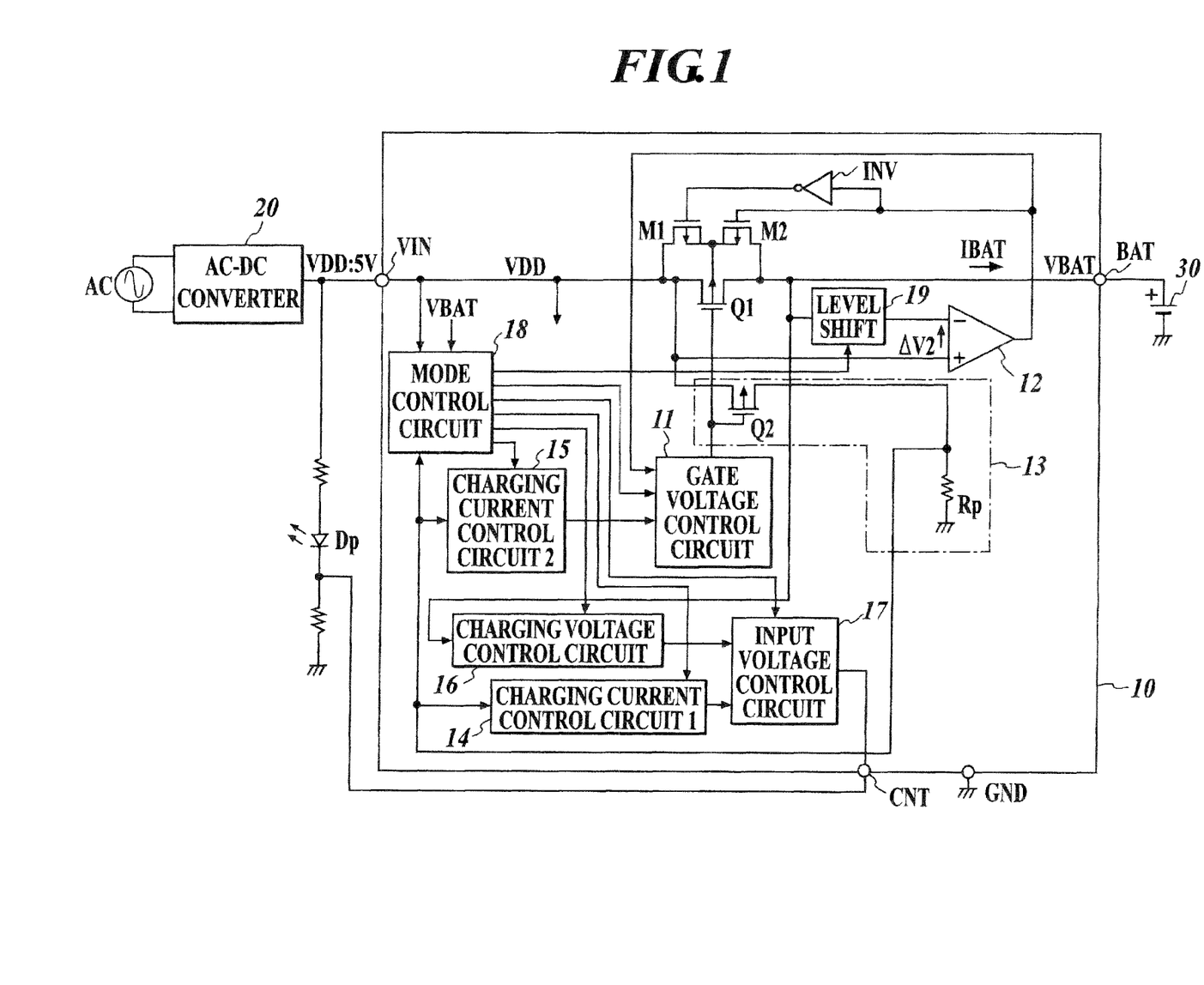
FIG. 1 is a schematically configuration diagram showing a sample of a charge-controlling IC and a charging apparatus using the charge-controlling IC to which the present invention is applied.

FIG. 1 shows an embodiment of a charge-controlling IC of a secondary battery, and a schematically configuration of a charging apparatus using the charge-controlling IC, to which the present invention is applied.

As shown in FIG. 1, the charging apparatus according to the embodiment includes: an AC-DC converter 20 to convert an alternating voltage AC to a direct voltage of, for example, 5V; and a charge-controlling IC 10 to charge a secondary battery 30 such as a lithium ion battery by a direct voltage VDD converted by the AC-DC converter 20. The AC-DC converter 20 is equipped with a diode bridge circuit for rectification, and a DC-DC converter which includes a transformer and performs switching drive by PWM or PFM method to a switching element connected to a primary-side coil of the transformer to generate desired direct voltage.

The charge-controlling IC 10 is equipped with a voltage input terminal VIN to which the direct voltage VDD from the AC-DC converter 20 is input, a battery terminal BAT as an output terminal to which the second battery 30 being subjected to a battery charge is connected, a current-controlling MOS transistor Q1 composed of a P-channel MOSFET provided between the voltage input terminal VIN and the battery terminal BAT, and a gate voltage control circuit 11 to generate a gate controlling voltage for the Q1.

The charge-controlling IC 10 also includes: a voltage comparison circuit 12 to compare the input voltage VDD and the voltage VBAT of the battery terminal BAT to detect which voltages is higher; a monitoring MOS transistor Q2 which has 1/N size of the current-controlling MOS transistor Q1, whose source terminal is connected to the voltage input terminal VIN, and whose control terminal (gate terminal) is supplied with the same voltage as the Q1; and a current detection circuit 13 connected between a drain terminal of the Q2 and a ground point and composed of a resistance Rp.

The charge-controlling IC 10 further includes: a first current control circuit 14 to control current for a rapid charge based on a detected signal of the current detection circuit 13; a second current control circuit 15 to control current for a preliminary charge; a charging voltage control circuit 16 to control voltage based on the battery voltage VBAT; an input voltage control circuit 17 to generate a voltage for a feedback signal to be supplied to a switching control circuit in the AC-DC converter 20 based on outputs of the current control circuit 14 and the charging voltage control circuit 16 in order to control the input voltage, and to output the generated voltage from an external terminal CNT; and a mode control circuit 18 to determine a control mode inside a chip depending on a charging state to control operations of the control circuits 11, 14-17.

Incidentally, the feedback signal to be supplied to the switching circuit in the AC-DC converter 20 needs to be fed back through a photo coupler because a DC-DC converter in the AC-DC converter 20 is an insulated converter. For this reason, in the embodiment, a photodiode Dp is provided between the input voltage VDD and the ground point, and the voltage to be output from the input voltage control circuit 17 to the external terminal CNT is applied to a cathode terminal of the photodiode Dp so that the photodiode Dp emits light.

In the AC-DC converter 20, a light receiving diode to receive emitted light from the photodiode Dp to perform photoelectric conversion, and a capacitor to be charged with a current from the light receiving diode and to generate a voltage depending on a light receiving time (pulse width) are provided, and the voltage of the capacitor becomes the feedback signal. There has been known a switching regulator provided with a light receiving circuit having such configuration and controls current flowing through the primary-side coil depending on the feedback signal (voltage) from the secondary battery side. Since a general switching regulator as above may be used as the DC-DC converter in the AC-DC converter, illustration is omitted.

Moreover, charge-controlling IC 10 of the embodiment includes: switch MOS transistors M1, M2 which is connected between a source or drain of the current-controlling MOS transistor Q1 and the substratum (backgate), and which selectively applies the input voltage VDD or the output voltage VBAT to the substratum of the Q1; and a level shift circuit 19 to shift a level of the battery voltage VBAT to supply the VBAT to the voltage comparison circuit 12. The M1, M2 are configured to be controlled to be the on-state or off-state complementary.

The level shift circuit 19 is configured to be capable of switching a level-shift function between valid and invalid according to a control signal from the mode control circuit 18. When the function becomes valid, the level shift circuit 19 shifts the battery voltage VBAT to lower side by ΔVB to supply the VBAT to the voltage comparison circuit 12, and when the function becomes invalid, the level shift circuit 19 directly supplies the battery voltage VBAT without shifting. On the other hand, the voltage comparison circuit 12 is configured to include an intentional offset ΔV2 whose direction is opposite to a shift direction of the battery voltage by the level shift circuit 19.

According to this configuration, when the level shift circuit 19 and the voltage comparison circuit 12 are regarded as one comparator, the voltage comparison circuit 12 outputs a result (when the level shift is valid) obtained by comparing the input voltage VDD and the battery voltage (VBAT−ΔVB+ΔV2) and a result (when the level shift is invalid) obtained by comparing the input voltage VDD and the battery voltage (VBAT+ΔV2).

Here, ΔVB is set to a larger value than offset ΔV2. By the operation, if ΔVB=ΔV1+ΔV2, the voltage comparison circuit 12 outputs a result obtained by comparing the VDD and (VBAT−ΔV1) when the level shift is valid. Although ΔV1 and ΔV2 need not to be same values, if ΔV1≠ΔV2 and each of ΔV1 and ΔV2 is set to a larger value than the maximum value of the offset (specific offset generated due to process) Vof included in a differential amplifier circuit constituting the comparator, a voltage comparison result which is riot influenced by the specific offset can be obtained. In the embodiment, since the maximum value of the specific offset Vof is 30 mV, ΔVB and ΔV2 are set such that ΔVB=100 mV and ΔV2=50 mV.

Incidentally, though not especially limited, the first current control circuit 14, the second current control circuit 15 and the charging voltage control circuit 16 may be composed of an error amplifier which generates a voltage depending on a potential difference between each input voltage and a predetermined voltage.

Figure 4:
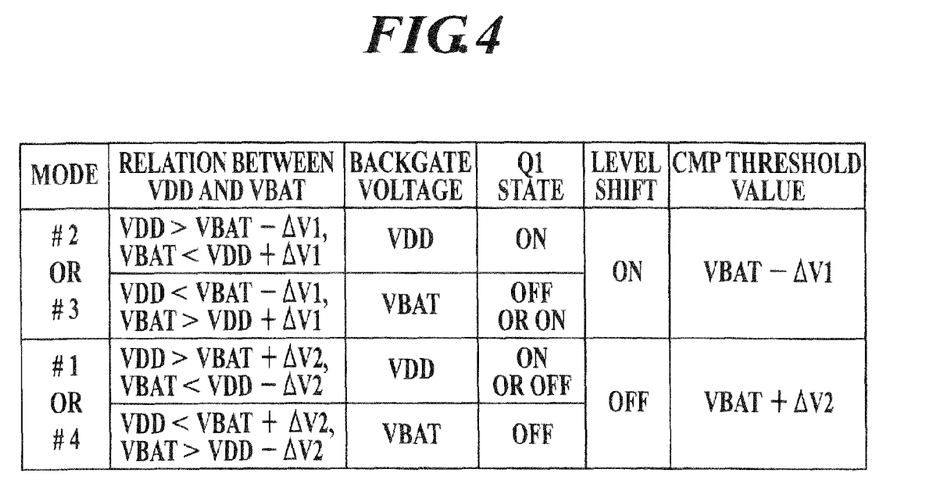
FIG. 4 is a chart showing relations between magnitude correlation between the VDD and (VBAT−ΔV1) or (VBAT+ΔV1) in each control mode of the charge-controlling IC according to the embodiment, and a backgate voltage and on/off state of a current-controlling transistor, a state of the level shift circuit, and a threshold value of a comparator (level shift and voltage comparison circuit)

Next, a mode control by the mode control circuit 18 will be described In FIG. 4, relations between magnitude correlation between the VDD and (VBAT−ΔV1) or (VBAT+ΔV1) in each control mode of the charge-controlling IC according to the embodiment, and a backgate voltage and on/off state of a current-controlling transistor, a state of the level shift circuit, and a threshold value of a comparator (level shift and voltage comparison circuit) are shown by arranged on a chart.

Inputs of the mode control circuit 18 are the input voltage VDD, the output voltage VBAT, and a detected signal VDET of the current detection circuit 13. The control mode is determined based on these inputs, and a signal for controlling on/off of the level shift circuit 19 and operations of the gate voltage control circuit 11, the first voltage control circuit 14, the second voltage control circuit 15, and the charging voltage control circuit 16 is generated according to the determined mode to be supplied.

The control mode by the mode control circuit 18 includes at least following four modes. A first mode #1 is a mode for performing preliminary charge immediately after starting a battery charge, and a mode which controls the current controlling MOS transistor Q1 according to the output of the current control circuit 15. When the mode control circuit 8 selects this mode, the gate voltage of the Q1 is controlled so that the current control circuit 15 and the gate voltage control circuit 11 control the current-controlling MOS transistor Q1 to flow comparatively small charging current (constant current) of, for example, 70 mA, based on the detected signal of the current detection circuit 13.

This preliminary charge is performed for recovering the battery voltage to about 3V in the case of the lithium ion battery, and since the battery rapidly deteriorates when the charging current is large, the battery charge is performed while suppressing the current, and this mode ends at the time when the battery voltage is recovered to about 3V. For example, in order to limit a preliminary charge time of the lithium ion battery to 20 minutes or less, it is possible to control the charge time by incorporating a timer. Incidentally, in this preliminary charge mode, comparatively high direct voltage VDD of, for example, 5V (constant) is input from the AC-DC converter 20.

Moreover, in this preliminary charge mode, a control signal representing OFF (invalid) is supplied from the mode control circuit 18 to the level shift circuit 19, and the level shift circuit 19 operates so as to directly transmit the voltage VBAT of the batter, terminal BAT to the voltage comparison circuit 12. Thus, the voltage comparison circuit 12 compares the input voltage VDD and (VBAT+ΔV2). Since the VDD is normally higher, an output of the voltage comparison circuit 12 becomes high level. As a result, the switch MOS transistors M1 for switching the backgate is turned on, and the switch MOS transistors M2 is turned off, so that the VDD is applied to the backgate of the Q1. Accordingly, even if the VDD is 0.7V or more higher than the VBAT, the current is prevented from flowing from the input terminal VIN to the battery terminal BAT via the parasitic diode of the Q1.

If for any reason the input voltage VDD becomes below (VBAT+ΔV2), the output of the voltage comparison circuit 12 becomes low level, and the switch MOS transistors M2 for switching the backgate is turned on, and the switch MOS transistors M1 is turned off, so that the VBAT is applied to the backgate of the Q1. Thus, the current is prevented from flowing from the battery terminal BAT to the input terminal VIN via the parasitic diode of the Q1.

At this time, since the voltage comparison, circuit 12 compares the input voltage VDD and (VBAT+ΔV2), even when the differential amplifier circuit in the voltage comparison circuit 12 includes the specific offset due to the process and even when the adaptor comes off and the AC-DC converter 20 stops so that the VDD becomes such that VDD=VBAT, it is possible to surely detect a state of (VDD<VBAT+ΔV2) By shifting the Q1 to the off-state, it is possible to avoid the problem that the current continuously flows from the secondary battery to each circuit in the charge-controlling IC 10 through the Q1 and the battery discharge electricity.

The second mode #2 is a mode for performing rapid discharge after the secondary battery recovers to about 3V by the preliminary charge, and which controls the output voltage of the AC-DC converter 20, namely the input voltage VDD, according to the output of the current control circuit 14. When the mode control circuit 18 selects this mode, the current control circuit 14 and the input voltage control circuit 17 control the voltage (for example, pulse) to be output to the external terminal CNT based on the detected signal of the current detection circuit 13, the AC-DC converter 20 controls the input voltage VDD so that the current-controlling MOS transistor Q1 flows comparatively large charging current (constant current) of, for example, 700 mA.

Figure 5:
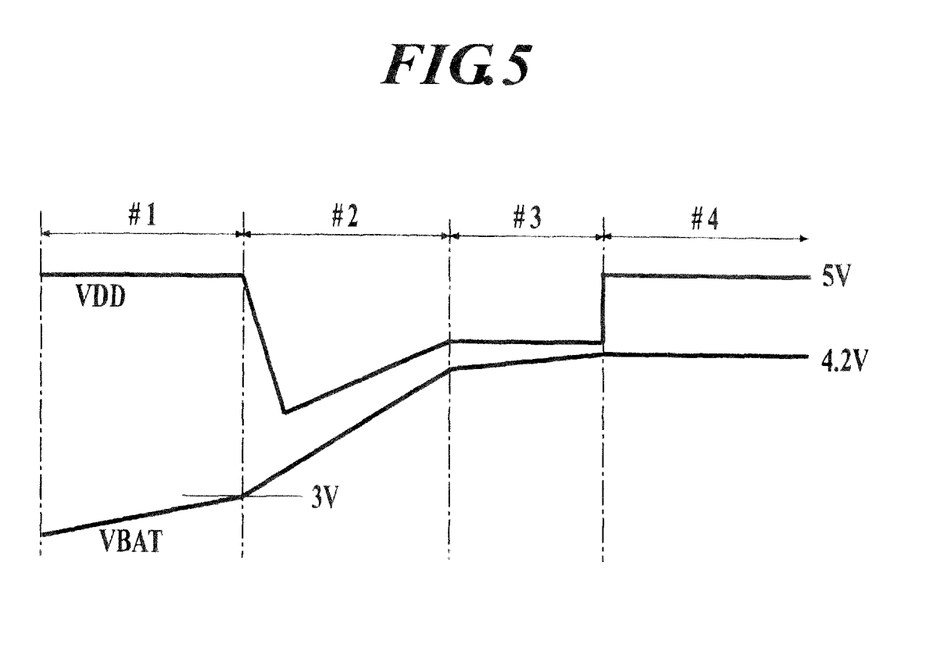
FIG. 5 is a time chart showing a relation between the input voltage VDD and the output battery voltage VBAT when the charge-controlling IC according to the embodiment is rapidly charged.

A rapid charge according to a conventional general constant current control is performed while the input voltage VDD from the AC-DC converter 20 is constant (for example, 5V), and in this case, there is a potential difference of 1V or more between the input voltage VDD and the battery voltage VBAT, and thereby power efficiency is not good. On the other hand, as the embodiment, when the rapid charge for controlling the input voltage VDD so that the charging current flowing through the Q1 becomes constant is performed, as a period 42 shown in FIG. 5, since the input voltage VDD is gradually heightened along with the process of the battery charge while maintaining the potential difference of the input voltage VDD slightly higher than the battery voltage VBAT, power efficiency is improved.

Furthermore, in this mode, the control signal representing ON (valid) is supplied from the mode control circuit 18 to the level shift circuit 19, and the level shift circuit 19 shifts the voltage VBAT of the battery terminal BAT to lower side by $\Delta$VB to supply the VBAT to the voltage comparison circuit 12. Thus, the voltage comparison circuit 12 compares the input voltage VDD and (VBAT$-\Delta$V1). In this case, since the VDD is normally higher, the output of the voltage comparison circuit 12 becomes high level. As a result, the switch MOS transistors M1 for switching the backgate is turned on, and the switch MOS transistors M2 is turned off, so that the VDD is applied to the backgate of the Q1.

Consequently, if the potential difference between the VDD and the VBAT is 0.7V or more, the current is prevented from flowing from the input terminal VIN to the battery terminal BAT through the parasitic diode of the Q1. Moreover, If for any reason the input voltage VDD becomes below (VBAT$-\Delta$V2), the output of the voltage comparison circuit 12 becomes low level, and the switch MOS transistors M2 for switching the backgate is turned on, and the switch MOS transistors M1 is turned off, so that the VBAT is applied to the backgate of the Q1. Thus, if the potential difference between the VDD and the VBAT is 0.7V or more, the current is prevented from flowing from the battery terminal. BAT to the input terminal VIN via the parasitic diode of the Q1.

Incidentally, at this time, since the voltage comparison circuit 12 compares the input voltage VDD and (VBAT$-\Delta$V1), if the differential amplifier circuit in the voltage comparison circuit 12 includes the specific offset due to the process, it appears that the state of VDD<VBAT cannot detected rapidly unlike the first control mode. However, if the adaptor comes off and the AC-DC converter 20 stops so that VDD=VBAT, the current such as 700 mA does not flow through the current-controlling MOS transistor Q1, and this state can be detected by the current detection circuit 13 including a sense MOS transistor Q2.

In that case, by allowing the mode control circuit 18 to send the control signal to the gate voltage control circuit 11 so that the Q1 shifts to the off-state, it is possible to avoid the problem that the current continuously flows from the secondary battery to each circuit in the charge-controlling IC 10 through the Q1. At the time of above detection, it is also possible to provide a proper delay time Tdet, and to allow the Q1 to shift to the off-state in the case that the current flows back during Tdet. According to this operation, when a cause of VDD<VBAT is not stop of the AC-DC converter 20, but is temporary, the on-state can continue without turning off the Q1.

The third mode #3 is a mode which performs a battery charge after the secondary battery reaches about 4.2V by the rapid charge till the battery becomes full-charged state, and which controls the output voltage of the AC-DC converter 20, namely the input voltage VDD, by the output of the charging voltage control circuit 16. When the mode control circuit 18 selects this mode, the charging voltage control circuit 16 and the input voltage control circuit 17 control the voltage to be output to the external terminal CNT based on the battery voltage VBAT, and the AC-DC converter 20 controls the input voltage VDD so that the Q1 flows the current while the battery voltage VBAT is constant (for example, 4.2V).

A conventional general rapid charge is performed while the input voltage VDD from the AC-DC converter 20 is constant (for example, 5V), and in this case, there is a potential difference of 0.8V or more between the input voltage VDD and the battery voltage VBAT, and thereby power efficiency is not good. On the other hand, as the embodiment, if the battery charge is performed by controlling the input voltage VDD while the Q1 is in the on-state, since the charging current gradually decreases along with the process of the battery charge while the input voltage VDD maintains slightly higher potential difference than the battery voltage VBAT so that the secondary battery reaches the full-charged state, power efficiency is improved. This constant current battery charge mode is performed until the charging current lowers to a current such as 70 mA for example, and then the transistor Q1 is turned off and the battery charge is completed.

Also in this mode, the control signal representing ON from the mode control circuit 18 to the level shift circuit 19, and the level shift circuit 19 shifts the voltage VBAT of the battery terminal BAT to the lower side by $\Delta$VB to supply the VBAT to the voltage comparison circuit 12. Thus, the voltage comparison circuit 12 compares the input voltage VDD and (VBAT$-\Delta$V1). In this case, normally the VDD is higher so that the output of the voltage comparison circuit 12 becomes high level. As a result, the switch MOS transistors M1 for switching the backgate is turned on, and the switch MOS transistors M2 is turned off, so that the VDD is applied to the backgate of the Q1.

Consequently, if the potential difference between the VDD and the VBAT is 0.7V or more, the current is prevented from flowing from the input terminal VIN to the battery terminal BAT through the parasitic diode of the Q1. Moreover, If for any reason the input voltage VDD becomes below (VBAT$-\Delta$V1), the output of the voltage comparison circuit 12 becomes low level, and the switch MOS transistors M2 for switching the backgate is turned on, and the switch MOS transistors M1 is turned off, so that the VBAT is applied to the backgate of the Q1. Thus, if the potential difference between the VDD and the VBAT is 0.7V or more, the current is prevented from flowing from the battery terminal BAT to the input terminal VIN via the parasitic diode of the Q1.

Incidentally, when the mode control circuit 18 starts the rapid charge, by allowing the current control circuit 14 and the charging voltage control circuit 16 to operate concurrently, it is possible to perform the control so that the process automatically shifts from the above-described second mode to the third mode.

The fourth mode #4 is a mode where the current-controlling MOS transistor Q1 is in the off-state and the battery charge is stopped. When the mode control, circuit 18 selects this mode, the control signal representing OFF (invalid) is supplied from the mode control, circuit 18 to the level shift circuit 19 and the level shift circuit 19 operates to directly transmit the voltage VBAT of the battery terminal BAT to the voltage comparison circuit 12.

Thus, the voltage comparison circuit 12 compares the input voltage VDD and (VBAT+$\Delta$V2), and when the VDD is higher, the output of the comparison circuit 12 becomes high level. As a result, the switch MOS transistors M1 for switching the backgate is turned on, and the switch MOS transistors M2 is turned off, so that the VDD is applied to the backgate of the Q1. According to the operation, even if the VDD is 0.7V or more higher than the VBAT, the current is prevented from flowing from the input terminal VIN to the battery terminal BAT through the parasitic diode of the Q1.

On the other hand, when the input voltage VDD is lower than (VBAT+$\Delta$V2), the output of the voltage comparison circuit 12 becomes low level. As a result, the switch MOS transistors M2 for switching the backgate is turned on, and the switch MOS transistors M1 is turned off, so that the VBAT is applied to the backgate of the Q1. According to the operation, even if the VBAT is 0.7V or more higher than the VDD, the current is prevented from flowing from the battery terminal BAT to the input terminal VIN through the parasitic diode of the Q1.

Incidentally, in this mode, since the current-controlling MOS transistor Q1 is in the off-state from the beginning, the problem that the current continuously flows from the secondary battery to each circuit in the charge-controlling IC through the Q1 so that the battery discharges electricity because the adaptor comes off does not occur like the first mode.

Figure 2:
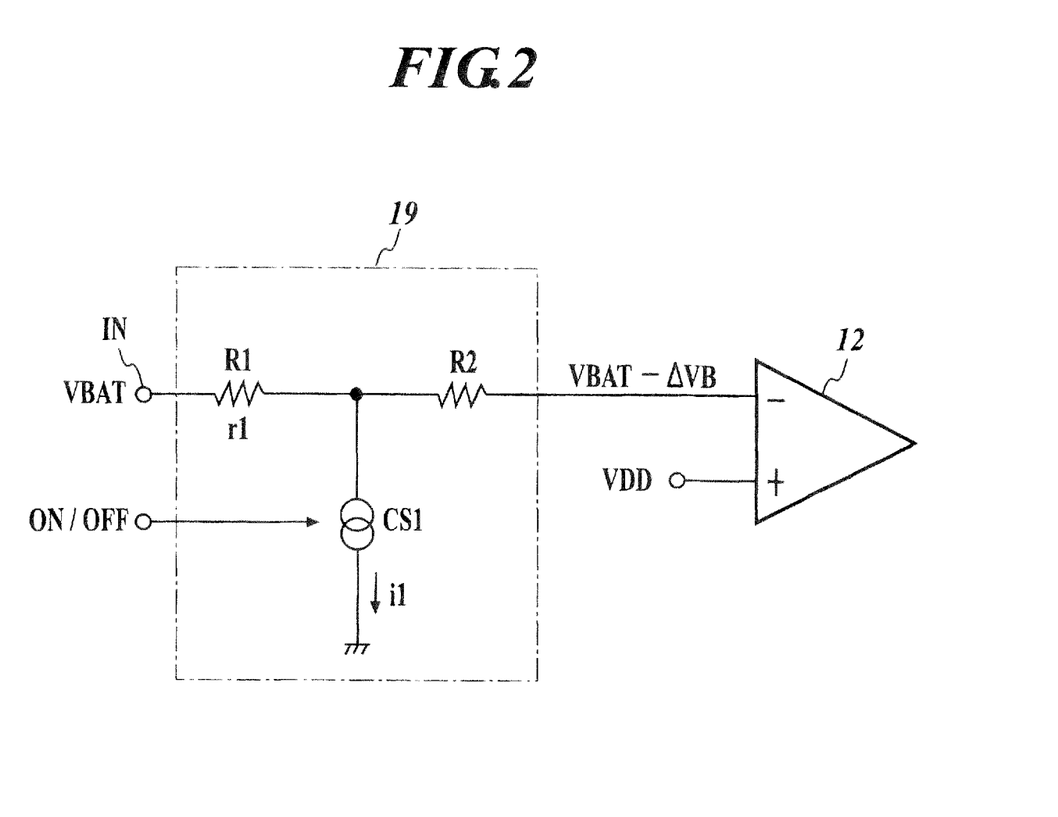
FIG. 2 is a circuit configuration diagram showing an embodiment of a level shift circuit according to the present invention.

FIG. 2 shows a specific circuit configuration diagram of the level shift circuit 19.

The level shift circuit of the embodiment includes: resistances R1, R2 connected in series between an input terminal IN to which the voltage VBAT of the battery terminal BAT is input and an inverted input terminal of the voltage comparison circuit 12 including offset in a subsequent stage; and a constant current source CS1 connected between a connecting node of R1, R2 and a ground point. The level shift circuit 19 is configured so that the constant current source CS1 is controlled to be on/off by the control signal on/off from the mode control circuit 18. The constant current source CS1 may be composed of one MOS transistor or bipolar transistor, or these transistors and a resistance connected thereto in series.

The voltage comparison circuit 12 in a subsequent stage is composed of a differential amplifier circuit including a pair of differential transistors in which a source terminal is commonly connected to input stages thereof. According to this configuration, when the constant current source CS1 becomes the off-state, the voltage VBAT of the battery terminal BAT is directly transmitted to the voltage comparison circuit 12 without performing level shift. On the other hand, when the constant current source CS1 becomes the on-state, voltage depression depending on a resistance value r1 of the resistance R1 and a current value I1 of the constant current value CS1 occurs in the resistance R1, and thereby the voltage lower than the VBAT by $\Delta VB$ ($=r1 \cdot I1$) is supplied to the voltage comparison circuit 12. In this embodiment, values of r1 and I1 are set so that $\Delta VB=100$ mV.

The voltage comparison circuit 12 is configured so that an input offset of 50 mV occurs in a minus direction by being designed so that a size ratio of the differential transistors in an inputting stage becomes a size ratio (approximate size of a transistor on the inverted input terminal side) like 3:4. In addition, the voltage comparison circuit 12 is configured to include hysteresis characteristics so as not to operate wrongly due to a noise.

Figure 3A:
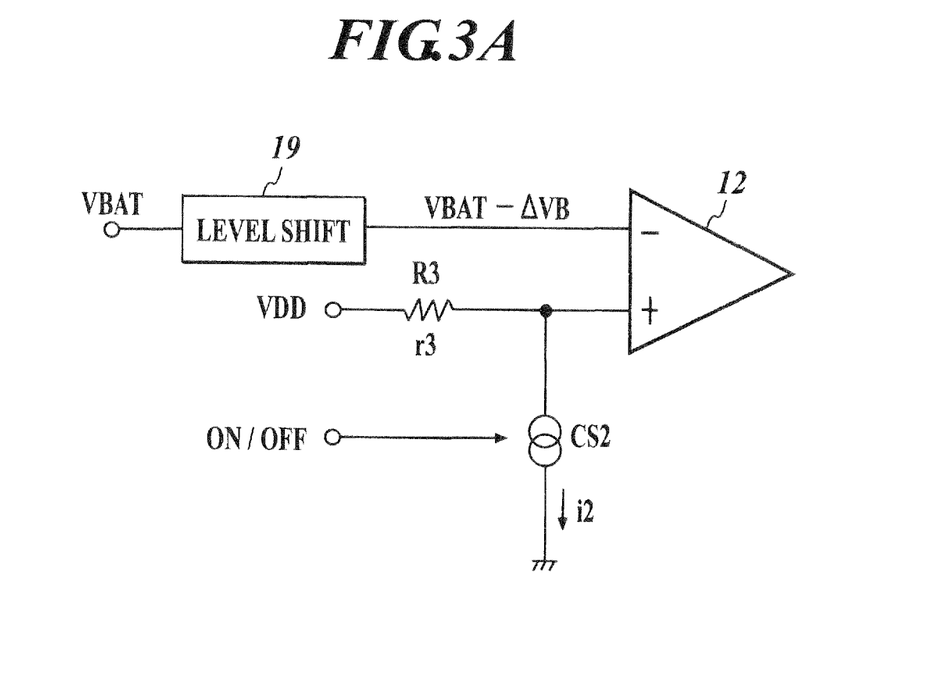
FIG. 3A is a circuit configuration diagram showing an another configuration example of a voltage comparison circuit including offset.
Figure 3B:
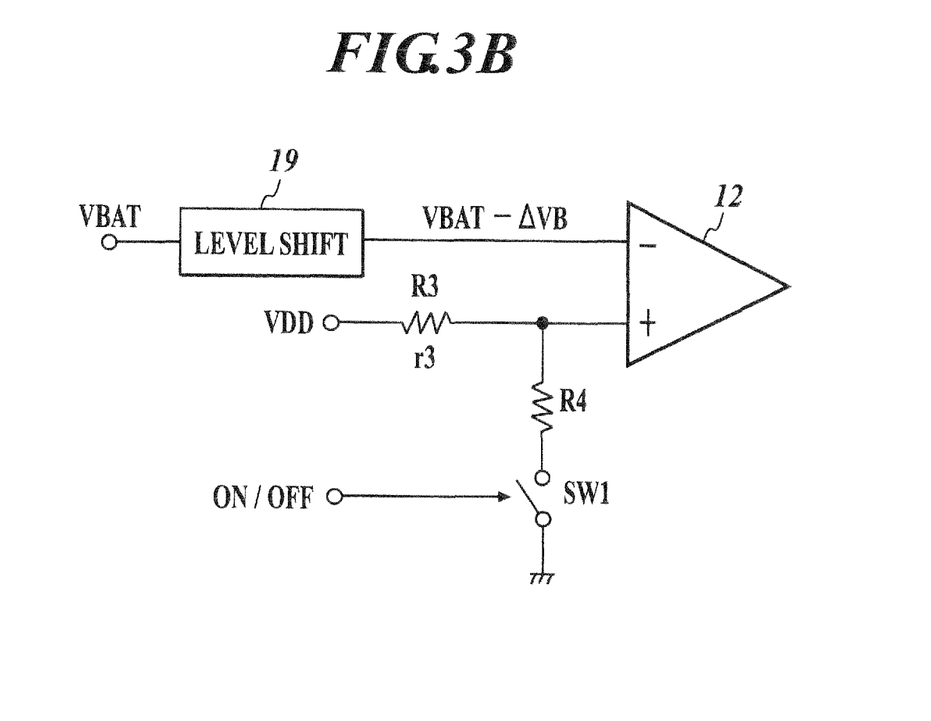
FIG. 3B is a circuit configuration diagram showing an another configuration example of a voltage comparison circuit including offset.

Incidentally, instead of providing the input offset by designing the differential transistors in the input stage to be the size ratio like 3:4, the input offset in a minus direction may be provided by allowing the size of the differential transistors to be 1:1, providing a level shift circuit composed of a resistance R3 and a constant current source CS2 as shown in FIG. 3A on the non-inverted input terminal, side or providing a level shift circuit composed of a resistance R4 and a switching element SW1 such as MOSFET instead of the constant current source as shown in FIG. 3B, and allowing the voltage depression of, for example, 50 mV, to occur in the resistance R3.

The embodiment of the present invention is described above, but the present invention is not limited to the above embodiment, and various changes are possible based on the technical idea of the present invention. For example, in the embodiment of FIG. 1, the charging current is detected by providing the current-controlling MOS transistor Q1 and the current-controlling MOS transistor Q2 and the resistance Rp which constitute a current mirror, but the Rp may be an outside part of the IC. In addition, a sense resistance may be provided in series with the current-controlling MOS transistor Q1 to detect the charging current.

Moreover, in the current detection circuit 13 of the embodiment of FIG. 1, a circuit where a current mirror ratio is improved by further connecting a transistor (assumed as Q3) in series with the current-detecting MOS transistor Q2, providing an operational amplifier whose input is drain voltage of the Q1 and Q2 to control the transistor Q3 in series with the Q2 by the operational amplifier may be used.

In above explanation, an example where the present invention is applied to the charge-controlling IC for the secondary battery is explained, but the present invention is not limited to the example, and may be applied to a power source controlling IC for a direct power source circuit such as a series regulator.

As described above, a charge-controlling semiconductor integrated circuit according to the embodiment includes: a current-controlling MOS transistor connected between a voltage input terminal and an output terminal, which current-controlling MOS transistor controls current flowing from the voltage input terminal to the output terminal; a substratum voltage switching circuit connected between the voltage input terminal and the output terminal, and a substratum of the current-controlling MOS transistor, and to which substratum an input voltage or an output voltage is applied; and a voltage comparison circuit to compare the input voltage and the output voltage, wherein the charge-controlling semiconductor integrated circuit is configured to control the substratum voltage switching circuit based on an output of the voltage comparison circuit, the voltage comparison circuit is configured to include an intentional offset in a first potential direction, and in a preceding stage of a first input terminal of the voltage comparison circuit, a level shift circuit to shift the output voltage to a potential direction opposite to the first potential direction is provided, and to a second input terminal of the voltage comparison circuit, the input voltage is input.

According to the above means, even if the voltage comparison circuit for comparing the input voltage and the output voltage includes the spontaneous offset which occurs due to the process, the spontaneous offset can be hidden by the intentional offset given by the design. As a result, it becomes possible to set the backgate of the current-controlling MOS transistor to a preferable voltage to prevent the back flow through the parasitic diode, to prevent the current-controlling MOS transistor from being turned off before becoming the full-charged state, and to turn off surely the current-controlling MOS transistor when it should be turned off.

Here, the intentional offset is set to a larger value than a spontaneous offset included in the voltage comparison circuit. Although a desired effective can be somewhat obtained when the intentional offset value is small, when the intentional offset is set to a large value, more effective value can be obtained. Moreover, a level shift amount of the level shift circuit is set to be twice as large as the intentional offset. Thus, it becomes possible to allow the voltage comparison circuit to have the intentional offsets in a minus direction and plus direction which are almost same in appearance.

Preferably, the charge-controlling semiconductor integrated circuit further includes: a current detection circuit to detect a magnitude of charging current flowing through the current-controlling MOS transistor; a first charging current control circuit to generate a signal for controlling the charging current to be a first current value based on a detected signal of the current detection circuit; a second charging current control circuit to generate a signal for controlling the charging current to be a second current value smaller than the first current value based on the detected signal of the current detection circuit; a charging voltage control circuit to generate a signal for controlling the output voltage to be a predetermined voltage based on the output voltage; a gate voltage control circuit to generate a gate controlling voltage for the current-controlling MOS transistor based on an output of the second charging current control circuit; and a mode control circuit to control an operation of each of the control circuits, wherein the level shift circuit is configured to be controlled to be an on-state or an off state by the mode control circuit. According to this configuration, the input voltage to be input to the charge-controlling semiconductor integrated circuit can be controlled so that power efficiency is improved, and the battery charge can be performed in the proper mode depending on the charge stage.

Preferably, the mode control circuit is configured to generate a signal for controlling an operation of each of the control circuits according to the input voltage, the output voltage, and the detected signal of the current detection circuit. According to this configuration, the mode control circuit can generate the signal for properly controlling the operation of each of the control circuits with comparatively small number of inputs.

Preferably, the charge-controlling semiconductor integrated circuit further includes an input voltage control circuit to output to the exterior a voltage for generating a feedback signal to be supplied to a converter which generates the input voltage, depending on an output of the first charging current control circuit and an output of the charging voltage control circuit, wherein the level shift circuit is configured to be controlled to be turned into the on-state in a mode where the input voltage control circuit outputs the voltage, and turned into the off-state in other modes. According to this configuration, it is possible to allow the level shift circuit to function validly by the output of the mode control circuit to properly perform the control of the substratum voltage switching circuit and the on/off control of the current-controlling MOS transistor. In other words, it is unnecessary to provide a dedicated control circuit in addition to the mode control circuit in order to control the level shift circuit.

According to the present invention, in charge-controlling IC configured to switch the backgate voltage of the current-controlling MOS transistor to prevent a back flow, even when the input offset occurs in the comparator during manufacturing process, the problem that the battery charge is stopped before becoming the full-charged state and the current continuously flows from the second battery side to the inner circuit of the IC so that the battery discharges electricity when the input voltage decreases. Moreover, in the charge-controlling IC including a plurality of control modes, there is an advantage that the backgate of the current-controlling MOS transistor can be set to a preferable voltage even in any of the control modes to prevent a flow back.

The entire disclosure of Japanese Patent Application No. 2008-131754 filed on May 20, 2008, including specification, claims, drawings and abstract are incorporated herein by reference in its entirety.

What is claimed is:

1. A charge-controlling semiconductor integrated circuit comprising:
    a current-controlling MOS transistor connected between a voltage input terminal and an output terminal, which current-controlling MOS transistor controls current flowing from the voltage input terminal to the output terminal;
    a substratum voltage switching circuit connected between the voltage input terminal and the output terminal, and a substratum of the current-controlling MOS transistor, wherein an input voltage or an output voltage is applied to said substratum,
    a voltage comparison circuit to compare the input voltage and the output voltage, wherein the voltage comparison circuit is configured to include an intentional offset in a first potential direction; and
    a level shift circuit to shift the output voltage to a potential direction opposite to the first potential direction,
    wherein:
    a voltage from the level shift circuit is input to a first input terminal of the voltage comparison circuit,
    the input voltage is input to a second input terminal of the voltage comparison circuit, and
    the charge-controlling semiconductor integrated circuit is configured to control the substratum voltage switching circuit based on an output of the voltage comparison circuit, such that:
        the substratum voltage switching circuit applies the input voltage to the substratum of the current-controlling MOS transistor when a sum of the voltage of the first input terminal and the intentional offset is lower than the voltage of the second input terminal, and
        the substratum voltage switching circuit applies the output voltage to the substratum of the current-controlling MOS transistor when the sum of the voltage of the first input terminal and the intentional offset is higher than the voltage of the second input terminal.

2. The charge-controlling semiconductor integrated circuit according to claim 1, wherein the intentional offset is set to a larger value than a spontaneous offset included in the voltage comparison circuit.

3. The charge-controlling semiconductor integrated circuit according to claim 2, wherein a level shift amount of the level shift circuit is set to be twice as large as the intentional offset.

4. The charge-controlling semiconductor integrated circuit according to claim 1, further comprising:
    a current detection circuit to detect a magnitude of charging current flowing through the current-controlling MOS transistor;
    a first charging current control circuit to generate a signal for controlling the charging current to be a first current value based on a detected signal of the current detection circuit;
    a second charging current control circuit to generate a signal for controlling the charging current to be a second current value smaller than the first current value based on the detected signal of the current detection circuit;
    a charging voltage control circuit to generate a signal for controlling the output voltage to be a predetermined voltage based on the output voltage;
    a gate voltage control circuit to generate a gate controlling voltage for the current-controlling MOS transistor based on an output of the second charging current control circuit; and
    a mode control circuit to control an operation of each of the control circuits,
    wherein the level shift circuit is configured to be controlled to be an on-state or an off state by the mode control circuit.

5. The charge-controlling semiconductor integrated circuit according to claim 4, wherein the mode control circuit is configured to generate a signal for controlling an operation of each of the control circuits according to the input voltage, the output voltage, and the detected signal of the current detection circuit.

6. The charge-controlling semiconductor integrated circuit according to claim 4, further comprising:
- an input voltage control circuit to output to an exterior a voltage for generating a feedback signal to be supplied to a converter which generates the input voltage, depending on an output of the first charging current control circuit and an output of the charging voltage control circuit,
- wherein the level shift circuit is configured to be controlled to be turned into the on-state in a mode where the input voltage control circuit outputs the voltage, and turned into the off-state in other modes.

7. A charging apparatus comprising:
- the charge-controlling semiconductor integrated circuit according to claim 6; and
- a converter to convert alternating voltage to generate the input voltage,
- wherein the converter is configured to control the input voltage depending on the voltage output from the input voltage control circuit.

8. The charge-controlling semiconductor integrated circuit according to claim 1, wherein the first potential direction is a plus side.

9. The charge-controlling semiconductor integrated circuit according to claim 1, wherein the first potential direction is a minus side.

* * * * *